3,378,383
HIGH MAGNESIA PRODUCT AND PROCESS OF MAKING THE SAME

Merton L. Van Dreser, Campbell, Calif., assignor to Kaiser Aluminum & Chemical Corporation, Oakland, Calif., a corporation of Delaware
No Drawing. Filed Oct. 11, 1965, Ser. No. 494,891
11 Claims. (Cl. 106—58)

This invention relates to a refractory product; and more particularly, it relates to a shaped, fired, product containing high amounts of magnesium oxide, and to a method of making the same.

In carrying out metallurgical operations, particularly in the production of steel and more especially where the basic oxygen process is operated, operating conditions are becoming increasingly severe with respect to the wear and effect on the refractories used to line the furnaces wherein these operations are carried out. This has necessitated a search for refractories which are stable under such severe conditions toward furnace atmospheres and furnace slag and which exhibit good refractoriness, e.g., have good load-bearing strength at high temperatures. It is also becoming recognized that it is very important that the refractory product have not only good cold strength and good high temperature strength, but that the refractory combine with erosion resistance, good strength as it is heated up through the intermediate temperatures. When placed in a furnace wall, a brick is sustaining a substantial load and is undergoing internal stresses because the face exposed to the heat of the furnace is increasing in temperature while there is a temperature gradient extending through the brick from the hot face to the cold face, thus creating stresses within the brick structure itself and it is important that the brick during such heating period does not break away at some zone back of the hot face where the temperature is less than that of the hot face or the hot zone. At the same time, the use of refractories having high fusion or melting points is essential, and in this regard, a refractory high in magnesium oxide is particularly desirable because this oxide, when pure, has a melting point approaching or about 2800° C. It is desired, particularly with high magnesia refractories, to attain high strengths during the conditions described above and to insure minimum deformation or creep of the brick during the heating up period and while under load.

According to the present invention, it has now been discovered that a fired shape of greatly improved strength and properties under the conditions described above, is attained by admixing in brick-making size ranges non-fused periclase particles which contain at least 98.5% magnesium oxide and not over 0.75% silica, with a bonding agent, pressing into shapes and firing to cause direct bonding between the periclase particles. The fired refractory shape comprises non-fused periclase particles which are in major portion or preferably substantially entirely directly bonded to each other and wherein there are not over 1.5% of impurities, that is, non-magnesia materials, disposed throughout the fired mass in discrete, discontinuous zones. The product contains not over 0.75% silica and not over 1.5% lime or CaO, the lime and silica being present in a respective weight ratio of at least 1:1. The fired product exhibits very good strength, but particularly, it exhibits a modulus of rupture at 1400° C. which is substantially higher than the modulus of rupture of a slightly less pure magnesia shape, for instance, containing only about 98% MgO. It is a characteristic of the fired product of the present invention that the periclase is present substantially entirely in euhedral form. As is well known, earlier magnesia products contained periclase particles in rounded or anhedral form, and it was a disadvantage of such products that the rounded periclase particles were embedded in matrices of silicates which had melting or fusion points substantially below that of magnesia itself, although considered to be satisfactory in the state of development of the metallurgical furnace art of their time.

According to the present invention, however, it is now possible to produce strong magnesia refractories wherein the periclase is present in the true euhedral form, that is, where the crystal surfaces are substantially flat and are thus enabled to bond directly to each other over such relatively large flat surfaces and without the interference of non-magnesia materials or silicate impurities seeping along the grain or crystal boundaries. Thus, in the present composition and product, the magnesia crystals not only do not roll on a lower melting matrix material but they are bonded directly to each other, preferably substantially entirely so bonded. The fired product of the present invention exhibits also good resistance to erosion by furnace slags, both with respect to the lime content and to the iron oxide content of such slags. It is a further characteristic of the product of the present invention that the lime to silica ratio is maintained at at least 1:1 and preferably is at least 1.86:1; that is to say, in the latter instance is in at least a dicalcium silicate ratio. It is advantageous to maintain approximately a dicalcium silicate ratio because this composition has the highest known melting point of any of the lime-silica compounds, and although present in such small amounts, it has surprisingly been found that maintaining such ratios results in excellent strengths of the product.

The magnesia used to make the products for the present invention can be derived from a number of sources, but it is a material containing at least 98.5% MgO. Magnesia derived from any commercial source contains small amounts of silica or lime, or most usually, both. These substances may be present in the desired weight ratios, and in this event, the starting magnesia can be fired, crushed to the desired grain sizes, admixed with a temporary bond, and formed into shape and fired. However, in many instances, the starting magnesia does not contain silica and lime in the desired weight ratios and in this event the necessary adjustments are made to provide such ratio.

The lime material which is employed in the present invention, where necessary, to adjust the lime:silica ratio in the product is calcium oxide or is a material which yields calcium oxide upon firing, for instance, calcium hydroxide, calcium carbonate, and the like. It is incorporated in finely divided form, preferably substantially entirely passing through a 325 mesh screen. The silica which is employed, where necessary, to adjust a lime:silica ratio in the product, is also very finely divided and preferably substantially passing 325 mesh. For example, as such silica there can be employed volatilized silica which is well known to this art and is recovered from the fumes coming from the furnaces wherein ferro-silicon is produced, for instance. Alternatively, other finely divided silicas such as diatomaceous earth or the like can be employed. Preferably such silica is of high purity, i.e., containing at least 90% silicon dioxide.

In preparing the products or articles of the present invention, the grain sized refractory batch containing the necessary amount of magnesium oxide, and the silica and calcium oxide in the amounts defined is thoroughly admixed with a temporary bonding agent, formed into shapes and fired at a temperature to effect direct bonding between the periclase particles of the batch, e.g., at least 1500° C. Such firing is preferably effected at 1700° C. In many instances, and where the starting magnesia material does not contain lime and silica in the desired proportions, a high purity magnesium oxide or magnesium oxide-yielding material is admixed with sufficient finely divided lime or lime-yielding materials as described above, or with sufficient finely divided silica as described above, as may be necessary, to provide the desired lime-to-silica ratio. The final admixture contains at least 98.5% of magnesium oxide, and lime and silica in a ratio of at least 1:1 by weight.

In one mode of carrying out the process of the present invention, such an admixture is then compacted or pressed into slabs, briquettes, or other desired shapes, preferably under pressure of at least 1,000 p.s.i. and advantageously at higher pressures. The compacted or compressed material is then heated to a dead burning temperature; e.g., at a temperature of at least 1400° C. and preferably at a temperature of about 1700° C. The sintered shape or article is then crushed and the crushed particles are selected in good brick-making size ranges, one example being shown below, and are mixed with about 0.5 to 1.5% of a bonding agent which is preferably a temporary bonding agent such as an organic bond, for instance, lignin sulfonate, dextrin, molasses, or the like; and with a small or tempering amount of water. Suitably the water is added in an amount of about 2 to 3.5% by weight of the total dry mix. Alternatively to the use of a temporary or organic bonding material such as described above, there can be employed a phosphate or a Sorel cement mixture including finely divided reactive magnesia and an amount of magnesium chloride or magnesium sulfate or chromic acid to give the magnesium oxy-salt cement upon hardening with water. However, for best results, it is preferred to use a lignin sulfonate. The brick mix is now pressed into shape under pressures as employed in the dry press; for instance, at least 5,000 lbs. p.s.i. and preferably under pressure of at least 10,000 lbs. p.s.i. If desired, the mass is dried at about 150° C. and is then fired at a temperature to effect direct bonding between the periclase particles and to form the ceramic bond. Such firing is preferably carried out at a temperature of at least 1500° C., but it is preferred to use a temperature of about 1700° C.; and it is suitable to hold at this temperature for about 6 hours in a preferred mode of operation.

If desired, the small amounts of lime or silica can be added to the starting magnesium compound, that is, the material which will be fired or calcined to form magnesia, and can be intermixed therewith in any desired manner. In one operation, for instance, the additives can be incorporated in precipitated magnesium hydroxide, and the whole mixture then fed to the calcining zone of a rotary kiln where the magnesium hydroxide is converted to magnesia. The magnesia so produced is then compacted or briquetted, sintered, sized as described above, and bricks are formed from such sized particles with the addition of a temporary bond and water. The bricks are fired as described hereinbefore. It is to be understood that in calcining or firing the magnesia material to form the starting grain, sintering aids as heretofore known, for instance chromium compounds, can be added if desired, so long as the final magnesia content is maintained at at least 98.5% MgO. As will be evident from the above discussion, the lime/silica ratio can be adjusted to the desired value by the incorporation of finely divided lime material or finely divided silica material, as necessary, to the starting magnesium compound, to the magnesia calcine, or during the sintering process. However, it has been surprisingly found that excellent final products are obtained by preparing a sintered magnesia grain, then incorporating the necessary amount of lime or silica to adjust the ratio, forming the admixture into bricks with the incorporation of the bonding agent in tempering amount of water as described, and firing to form a ceramic bond and to effect direct bonding between the periclase particles. In the latter instance, excellent strengths and erosion resistance have been found in the final product.

It is an advantage of the product of the present invention that the fired shape exhibits excellent erosion resistance, and also better strength as indicated by modulus of rupture, at 1400° C. than have been attainable by the bricks known to the art. In most prior practices, modulus of rupture has been determined and reported at 2300° F. or 1260° C., and it has heretofore been found that the strengths fall off quite noticeably at 1400° C. The present invention on the other hand enables the attainment of high strength at 1400° C. which is more closely correlated with the actual working conditions in a furnace.

The fired article made according to this invention can also be impregnated with a cokable, carbonaceous bonding agent such as tar or pitch, e.g., by immersing the article in a bath of molten tar or pitch, if desired after applying vacuum to enable better penetration of the impregnant into the refractory mass. Such impregnated articles have exhibited excellent erosion resistance. In one series of tests, bricks made according to the present invention, containing over 99% MgO and impregnated with tar lost about $5/32''$ in depth when subjected to erosion tests with a typical steel-furnace slag; and bricks containing about 95% MgO and made according to U.S. 2,537,013, Austin et al., under the same tests lost $13/32''$, or over 2.5 times as much loss as the present brick.

In a series of tests on modulus of rupture at 1400° C., the values for bricks made according to the best prior art and exhibiting the approximate MgO contents noted were found to be as follows: (a) 90% MgO, about 620 p.s.i., (b) 95% MgO, 480 p.s.i., (c) 96% MgO, 400 p.s.i., (d) 98.1% MgO, 320 p.s.i. In all of these bricks, the $CaO/SiO_2$ ratio was over 1.7/1. In the same series of tests, bricks made according to the present invention and containing 98.8% MgO and having a $CaO/SiO_2$ ratio of 3.4, exhibited a modulus of rupture at 1400° C. of 943 p.s.i. This demonstrates the sharp upward break which is noted in a graph plotted on such values and a complete reversal of the trend heretofore found in known bricks of increasing MgO content and high lime-to-silica ratio. At the same time, the erosion resistance is improved; and the bricks of the present invention are only slightly attacked by lime slags and favorably react with or adsorb iron oxides.

In another series of tests, brick made as described herein and containing about 99% MgO and having a $CaO/SiO_2$ ratio of 1:1 exhibited an MOR at 1400° C. of 743 p.s.i. which was substantially higher than that of a brick containing 97.7% MgO and having a $CaO/SiO_2$ ratio of 1:1 and MOR at 1400° C. of less than 100 p.s.i.

As a further illustration of the mode of carrying out the present invention, the following example is given.

Example I

A powdered, calcined magnesia having an average particle size of less than 1 micron diameter and containing 99.7% MgO, 0.05% $SiO_2$, 0.17% CaO, 0.033% $Fe_2O_3$ and the remainder (less than 0.05%) undetermined, is mixed with sufficient calcium hydroxide passing 325 mesh to give a total of 0.89% CaO and with sufficient reagent grade silica passing 325 mesh to give 0.26% $SiO_2$, both on the ignited basis. The admixture is compacted into slabs about 1 inch thick and 9 x 4 inches square (or other dimensions for ease of handling) under 1000 p.s.i. pressure and the slabs are fired at 1700° C. for 6 hours. The fired slabs are crushed and sized to yield a grain mixture containing about 44% of particles passing 4 mesh and retained on 10 mesh; 20% passing 10 mesh and retained on 35 mesh; 9% passing 35 and retained on 65 mesh; and 27% passing 100 mesh. These are blended thoroughly with 0.75% lignin sulfonate and 3% water and formed into bricks under 10,000 p.s.i. pressure. The bricks are dried 8 hours at 150° C., then fired at 1700° C. for 6 hours. The fired shapes are cooled, cut into bars 1″ x 1″ x 6″ in size and tested for modulus of rupture at 1400° C., employing at test method according to A.S.T.M. Cl33–55. The average of six tests was 943 p.s.i. at 1400° C. The modulus of rupture at 1260° C. was similarly tested and found to be 1046 p.s.i. Examination of thin sections of these brick under a petro-graphic microscope show that the magnesia is substantially euhedral in form and that silicates are dispersed in very small discrete zones, generally collected at the junctures of magnesia crystals where plane surfaces terminate, or so-to-speak, at the "corners." The magnesia crystals are substantially free of any silicate or matrix film.

As described above, the method of making can be varied and can be carried out in several alternative modes. In each instance, the product exhibits high strength at the intermediate temperatures, either at 1260° C. or 1400° C., reversing the previous downward trend of such strengths with increasing MgO content as hitherto known. The $CaO/SiO_2$ ratio is maintained at a value of at least 1:1, and preferably 1.86/1 ($CaO/SiO_2$) or higher.

In conformity with common practice in reporting chemical analyses of refractory materials, in this specification and claims the proportions of the various chemical constituents present in a material are given as though these constituents were present as the simple oxides. Thus, the magnesium content is referred to as magnesium oxide or MgO, the silicon content as silica, silicon dioxide or $SiO_2$, and so on, although the silica may be present in combination with MgO, CaO or other constituent. Percentages or parts given in this specification and in the appended claims are by weight unless otherwise indicated. It is to be understood that firing is effected without general fusion. Particle sizes are those of Tyler screens as set forth, e.g., in "Chemical Engineers Handbook," John H. Perry, Editor-in-chief, Second edition, McGraw-Hill Book Co., 1941, at page 1719.

Having now described the invention, what is claimed is:

1. A fired refractory shape consisting essentially of non-fused periclase particles in brick-making size ranges substantially entirely directly bonded to each other, and not over 1.5% of impurities disposed in discrete, discontinuous zones, said shape containing at least 98.5% magnesium oxide, not over 0.75% silica, and not over 1.5% CaO, said CaO and silica being present in a weight ratio of at least 1:1, at least a major portion of the surfaces of said periclase particles being free of matrix film.

2. A fired refractory shape consisting essentially of periclase particles in brick-making size ranges directly bonded to each other, said shape containing at least 98.5% magnesium oxide, not over 0.75% silica, and not over 1.5% CaO, said CaO and silica being present in a weight ratio of at least 1:1, said periclase particles being substantially free of matrix film, and being substantially entirely in euhedral form.

3. A refractory shape as in claim 2 wherein said CaO and silica are present in a weight ratio of at least 1.86:1.

4. A fired refractory shape as in claim 2 wherein said silica is present in an amount of less than 0.5%.

5. A fired refractory shape consisting essentially of nonfused periclase particles in brick-making size ranges, at least a major portion of said periclase particles being directly bonded to each other, said shape containing at least 98.5% magnesium oxide, not over 0.75% silica, not over 1.5% CaO, said CaO and silica being present in a weight ratio of at least 1:1, at least a major portion of the surfaces of said periclase particles being free of silicate film, said shape being impregnated with a cokable, carbonaceous agent.

6. A method of making a fired refractory shape comprising:
    (A) preparing a batch of non-fused periclase particles in brick-making size ranges,
    (B) said batch containing at least 98.5% MgO and not over 0.75% silica and not over 1.5% CaO,
    (C) adjusting the weight ratio of lime to silica in said batch to a value of at least $1CaO$ to $1SiO_2$ while maintaining at least 98.5% MgO therein,,
    (D) thoroughly admixing with said batch from 0.5% to 1.5% of a bonding agent and from about 2% to about 3.5% water,
    (E) pressing said admixture into shapes and
    (F) firing said shapes to form a ceramic bond and to effect direct bonding of said periclase particles to each other.

7. A method of making a fired refractory shape comprising:
    (A) preparing a batch of a finely divided high purity magnesia containing at least 98.5% MgO, not over 0.75% $SiO_2$ and not over 1.5% CaO.
    (B) adjusting the lime-to-silica weight ratio of said batch to a value of at least $1CaO$ to $1SiO_2$ while maintaining at least 98.5% MgO therein,
    (C) forming said batch into compacted shapes,
    (D) firing said shapes to at least 1400° C. to deadburn said magnesia,
    (E) crushing said shapes to provide periclase in predetermined graded grain sizes,
    (F) Admixing said grain sized periclase with from 0.5% to 1.5% of a bonding agent and from 2.0% to 3.5% water,
    (G) forming said admixture into shapes and,
    (H) firing said last-mentioned shapes to form a direct bond between said periclase particles.

8. Method as in claim 7 wherein said bonding agent is lignin sulfonate.

9. Method as in claim 7 wherein there are admixed with said periclase 0.75% lignin sulfonate and 2.5% water.

10. Method as in claim 7 wherein said last-mentioned shapes are fired at 1700° C.

11. A refractory batch adapted to provide high strength, refractory shapes consisting essentially of euhedral magnesia crystals directly bonded to each other and not over 1.5% impurities, said batch consisting essentially of periclase particles in brick-making size ranges and a bonding agent, said batch containing on the ignited basis at least 98.5% MgO, not over 0.75% $SiO_2$, and not over 1.5% CaO, said lime and silica being present in weight ratio of at least $1CaO$ to $1SiO_2$.

References Cited
UNITED STATES PATENTS 3,141,790  7/1964  Davies et al. _____ 106—58

FOREIGN PATENTS 536,146  1/1957  Canada.

TOBIAS E. LEVOW, *Primary Examiner.*

HELEN M. McCARTHY, *Examiner.*

J. E. POER, *Assistant Examiner.*